US011897312B2

United States Patent
Shimauchi (10) Patent No.: US 11,897,312 B2
(45) Date of Patent: Feb. 13, 2024

(54) AIR CONDITIONER FOR FUEL CELL VEHICLE

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 17/591,968

(22) Filed: Feb. 3, 2022

(65) Prior Publication Data

US 2022/0250438 A1    Aug. 11, 2022

(30) Foreign Application Priority Data

Feb. 10, 2021    (JP) ................................. 2021-019989

(51) Int. Cl.
*B60H 1/00*    (2006.01)
*B60H 1/14*    (2006.01)

(52) U.S. Cl.
CPC ..... *B60H 1/00764* (2013.01); *B60H 1/00278* (2013.01); *B60H 1/00385* (2013.01); *B60H 1/00735* (2013.01); *B60H 1/00885* (2013.01); *B60H 1/143* (2013.01)

(58) Field of Classification Search
CPC ............ B60H 1/00764; B60H 1/00278; B60H 1/00385; B60H 1/00735; B60H 1/00885; B60H 1/143; B60H 1/20
See application file for complete search history.

(56) References Cited

U.S. PATENT DOCUMENTS

| | | | |
|---|---|---|---|
| 9,122,567 B2* | 9/2015 | MacNeille | G01C 21/3415 |
| 10,858,010 B2* | 12/2020 | Kujubu | B60T 8/3205 |
| 11,085,356 B2* | 8/2021 | Mendez Abrego | B60K 11/02 |
| 11,167,744 B2* | 11/2021 | Wang | B60W 20/12 |
| 11,463,038 B2* | 10/2022 | Itou | H02M 3/1586 |
| 11,745,738 B2* | 9/2023 | Roth | B60W 10/08 |
| | | | 701/93 |
| 2015/0066259 A1* | 3/2015 | Thompson | B60W 20/14 |
| | | | 180/65.265 |
| 2017/0309093 A1* | 10/2017 | Feng | B60W 10/10 |
| 2018/0251036 A1* | 9/2018 | Tapadia | H02P 5/74 |
| 2019/0381894 A1* | 12/2019 | Kujubu | B60W 50/10 |
| 2020/0358359 A1* | 11/2020 | Gagas | H02M 1/08 |

(Continued)

FOREIGN PATENT DOCUMENTS

| | | | |
|---|---|---|---|
| JP | 2015-209030 A | 11/2015 | |
| JP | 2021-174203 A | 11/2021 | |
| WO | WO-2013005295 A1 * | 1/2013 | ............. B60L 1/003 |

*Primary Examiner* — Ljiljana V. Ciric
(74) *Attorney, Agent, or Firm* — Dinsmore & Shohl LLP (57) ABSTRACT

An air conditioner for a fuel cell electric vehicle includes a heater core configured to circulate a heat medium from a fuel cell stack and perform heating by heat exchange with air, and a control unit configured to calculate a travel resistance when the fuel cell electric vehicle travels on a road based on a road state affecting the travel resistance generated when the fuel cell electric vehicle travels and an environmental state, and control the heat exchange in the heater core based on the calculated travel resistance. When the travel resistance is equal to or greater than a predetermined value, the control unit restricts an operation for the heating using waste heat of the fuel cell stack.

5 Claims, 6 Drawing Sheets

(56) References Cited

U.S. PATENT DOCUMENTS

| | | | |
|---|---|---|---|
| 2021/0194404 A1* | 6/2021 | Itou | H02M 3/1586 |
| 2022/0250438 A1* | 8/2022 | Shimauchi | B60H 1/00278 |
| 2023/0139003 A1* | 5/2023 | Bhasme | B60L 15/2045 |
| | | | 701/533 |
| 2023/0150398 A1* | 5/2023 | Kim | H01M 10/446 |
| | | | 429/429 |

* cited by examiner

AIR CONDITIONER FOR FUEL CELL VEHICLE

CROSS REFERENCE TO RELATED APPLICATION

This application claims priority to Japanese Patent Application No. 2021-019989 filed on Feb. 10, 2021, which is incorporated herein by reference in its entirety including the specification, claims, drawings, and abstract.

TECHNICAL FIELD

The present disclosure relates to an air conditioner for a fuel cell vehicle (hereinafter fuel cell electric vehicle) that uses waste heat of a fuel cell stack for heating.

BACKGROUND

There has been known a fuel cell electric vehicle that travels using electric power generated by a fuel cell. Here, in the fuel cell, heat is generated during the power generation, and using waste heat generated in the fuel cell for heating is also proposed. In particular, in the fuel cell, a heat generation amount can be controlled by controlling power generation efficiency, and therefore, the heat corresponding to a heating request can be output.

In JP 2015-209030 A, cooling water is circulated to cool a fuel cell, but the high-temperature cooling water discharged from the fuel cell is used for heating, and a plurality of cooling water circulation methods are prepared to optimize the heating according to a temperature of the cooling water.

Here, in the related art, in response to a heating request, an extra heat generation amount (heat generation amount for heating) in the fuel cell is determined without considering a traveling state. However, since a waste heat amount of the fuel cell also changes depending on the traveling state, extra heat generation for the heating may not be necessary, depending on the traveling state. In particular, the heat generation for the heating in the fuel cell has low energy efficiency, and a maximum travel distance of a vehicle is shortened by performing the heat generation for the heating.

SUMMARY

As an example of the present disclosure, an air conditioner for a fuel cell electric vehicle that uses waste heat of a fuel cell stack for heating includes: a heater core configured to circulate a heat medium from the fuel cell stack and perform the heating by heat exchange with air; and a control unit configured to calculate a travel resistance when the fuel cell electric vehicle travels on a road based on a road state affecting the travel resistance generated when the fuel cell electric vehicle travels and an environmental state, and control the heat exchange in the heater core based on the calculated travel resistance. When the calculated travel resistance is equal to or greater than a predetermined value, the control unit restricts an operation for the heating using the waste heat of the fuel cell stack.

The road state can include a road gradient of the road on which the vehicle travels and a friction coefficient of a standard road surface of the road.

The environmental state can include a temperature and a rainfall state during the traveling.

When a difference between a standard travel resistance when the road state and the environmental state are standard and the calculated travel resistance is equal to or greater than a predetermined value, the control unit can restrict the operation for the heating using the waste heat of the fuel cell stack.

Further, the air conditioner includes a navigation device configured to perform route guidance along a set route. The control unit can calculate a travel resistance in the set route, and restrict the operation for the heating using the waste heat of the fuel cell stack based on the travel resistance in the set route.

According to the present disclosure, the heating by the waste heat of the fuel cell stack is restricted in consideration of the travel resistance. Accordingly, operation efficiency of the fuel cell stack can be improved, and a maximum travel distance can be maintained to be large.

BRIEF DESCRIPTION OF DRAWINGS

Embodiment(s) of the present disclosure will be described based on the following figures, wherein.

DESCRIPTION OF EMBODIMENTS

Hereinafter, an embodiment of the present disclosure will be described with reference to the drawings. The present disclosure is not limited to the embodiment to be described herein.

"System Configuration"

Figure 1:
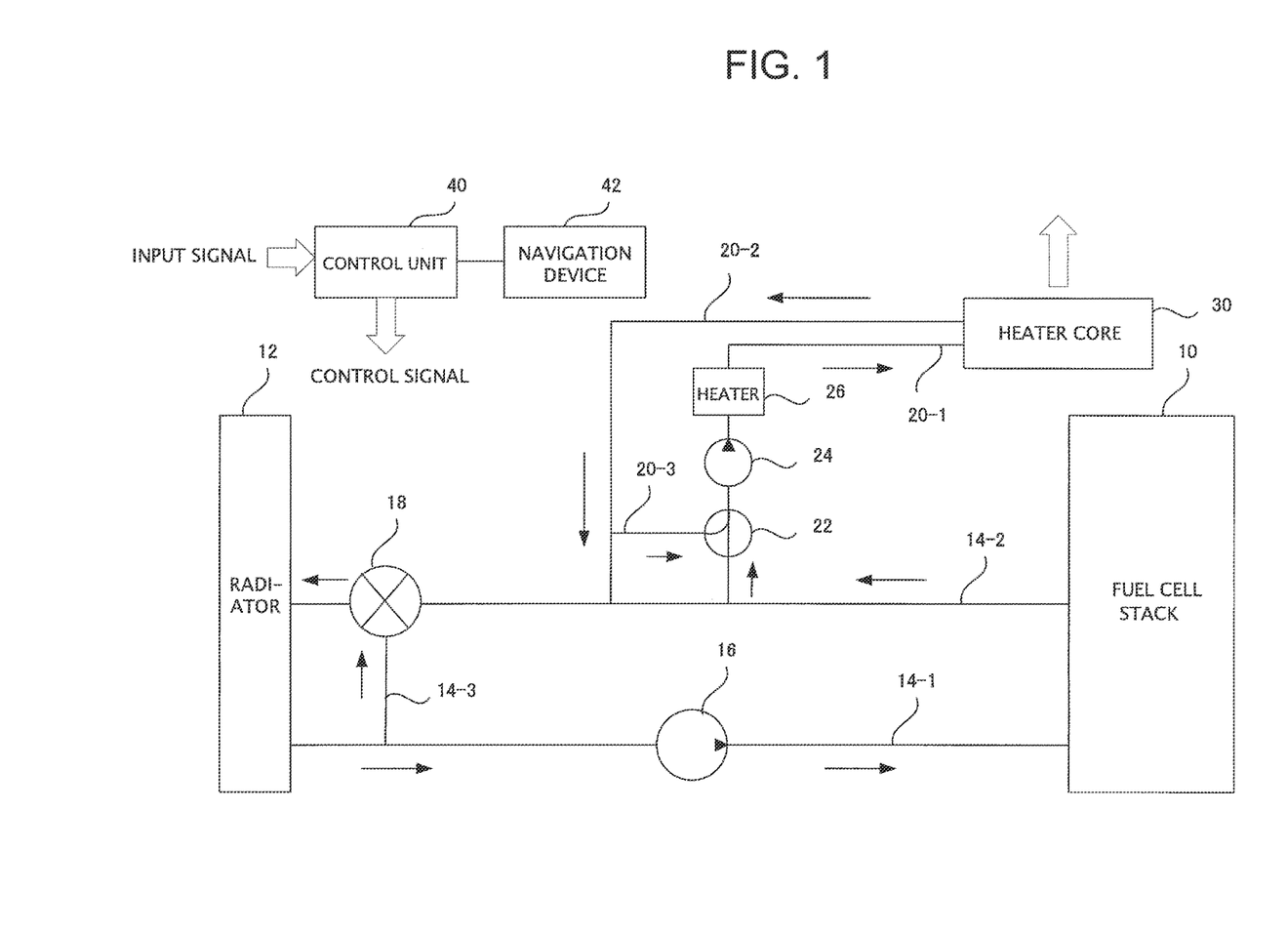
FIG. 1 is a block diagram showing an overall configuration of an air conditioning system using an FC stack.

FIG. 1 is a block diagram showing an overall configuration of an air conditioning system using a fuel cell stack (FC stack) 10. The FC stack 10 generates electric power by combusting fuel gas such as hydrogen, and includes a circulation system of hydrogen gas, a supply and discharge system of air, an output system of the generated electric power, and the like. That is, energy obtained by burning hydrogen gas in a fuel cell is output as electric energy.

Here, an operation of the FC stack 10 is controlled by a circulation amount of hydrogen gas, a supply amount of air, a magnitude of the output power, and the like. Normally, the operation is performed under an optimum operation condition, and power generation efficiency can be controlled by changing an operation condition, and a heat generation amount (waste heat amount) increases by decreasing the power generation efficiency. Therefore, waste heat can be used for heating by increasing the waste heat amount in response to a heating request and heating a heat medium (usually water) with the waste heat.

The FC stack 10 generates heat by the power generation. Therefore, the FC stack 10 is provided with a circulation path for the heat medium, and the heat medium passing through the circulation path is circulated to a radiator 12 to be cooled. In FIG. 1, a pump 16 is provided in a pipeline 14-1 connecting the radiator 12 and the FC stack 10. Further, a rotary valve 18 is provided in a pipeline 14-2 connecting the FC stack 10 and the radiator 12, and a branch pipeline 14-3 from the pipeline 14-1 is connected to the rotary valve 18.

Therefore, by supplying the heat medium from the radiator 12 to the FC stack 10 through the pipeline 14-1 and supplying the heat medium from the FC stack 10 to the radiator 12 through the pipeline 14-2 by driving the pump 16, the heat medium circulates through the FC stack 10 and the radiator 12, and heat absorbed in the FC stack 10 is dissipated by the radiator 12, so that the FC stack 10 can be cooled.

A branch pipeline 20-1 is connected to the pipeline 14-2, and a heater core 30 is connected to the branch pipeline 20-1 via a three-way valve 22, a pump 24, and a heater 26, and the heater core 30 is connected to the pipeline 14-2 via a branch pipeline 20-2. Further, the branch pipeline 20-2 is also connected to the three-way valve 22 via a branch pipeline 20-3.

Therefore, by connecting the branch pipeline 20-1 to the pump 24 by the three-way valve 22, the heat medium from the FC stack 10 can be supplied to the heater 26 and the heater core 30 by the pump 24 and then return to the pipeline 14-2. Further, by selecting the branch pipeline 20-3 by the three-way valve 22, the heat medium from the pump 24 can be circulated through a path including the heater 26, the heater core 30, and the three-way valve 22.

The rotary valve 18 can supply the heat medium from the pipeline 14-2 and the branch pipeline 14-3 to the radiator 12 at any ratio. That is, the rotary valve 18 can control a ratio of the heat medium circulating in the radiator 12 to the heat medium circulating in the FC stack 10.

A control unit 40 controls various members, switches a circulation mode of the heat medium by controlling the three-way valve 22, changes flow rates of the pumps 16 and 24, and controls a heat generation amount of the heater 26 and the waste heat amount of the FC stack 10, depending on input signals.

Further, a navigation device 42 is connected to the control unit 40. The navigation device 42 has map data and the like, displays a current location on a map, and searches and sets a route to a destination when the destination is set and performs route guidance depending on signals from a current location detection unit such as a GPS device. The navigation device 42 has a communication function, and can acquire map information and route information from a server on the cloud.

"Circulation Mode"

<Single Mode>

Figure 2:
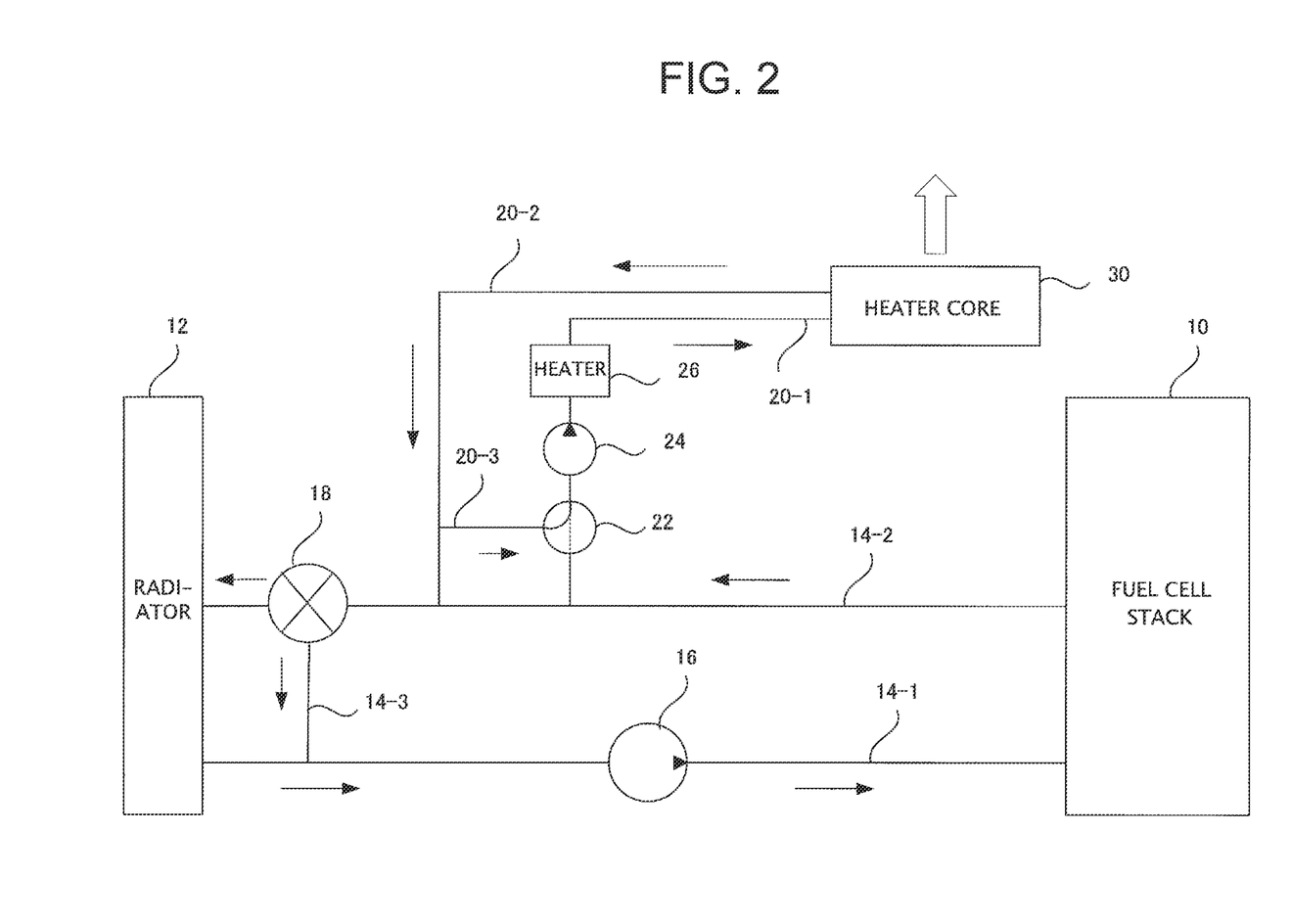
FIG. 2 is a diagram showing a state of a single mode for heating.

FIG. 2 shows a state of a single mode for the heating. In the single mode, the path from the pipeline 14-2 is closed by the three-way valve 22 and the heat medium from the branch pipeline 20-3 is circulated in the heater 26 and the heater core 30. Therefore, heat exchange of the heater core 30 can be controlled by the heat generation of the heater 26, and the heating is controlled separately from the heat generation of the FC stack 10.

<Cooperation Mode>

Figure 3:
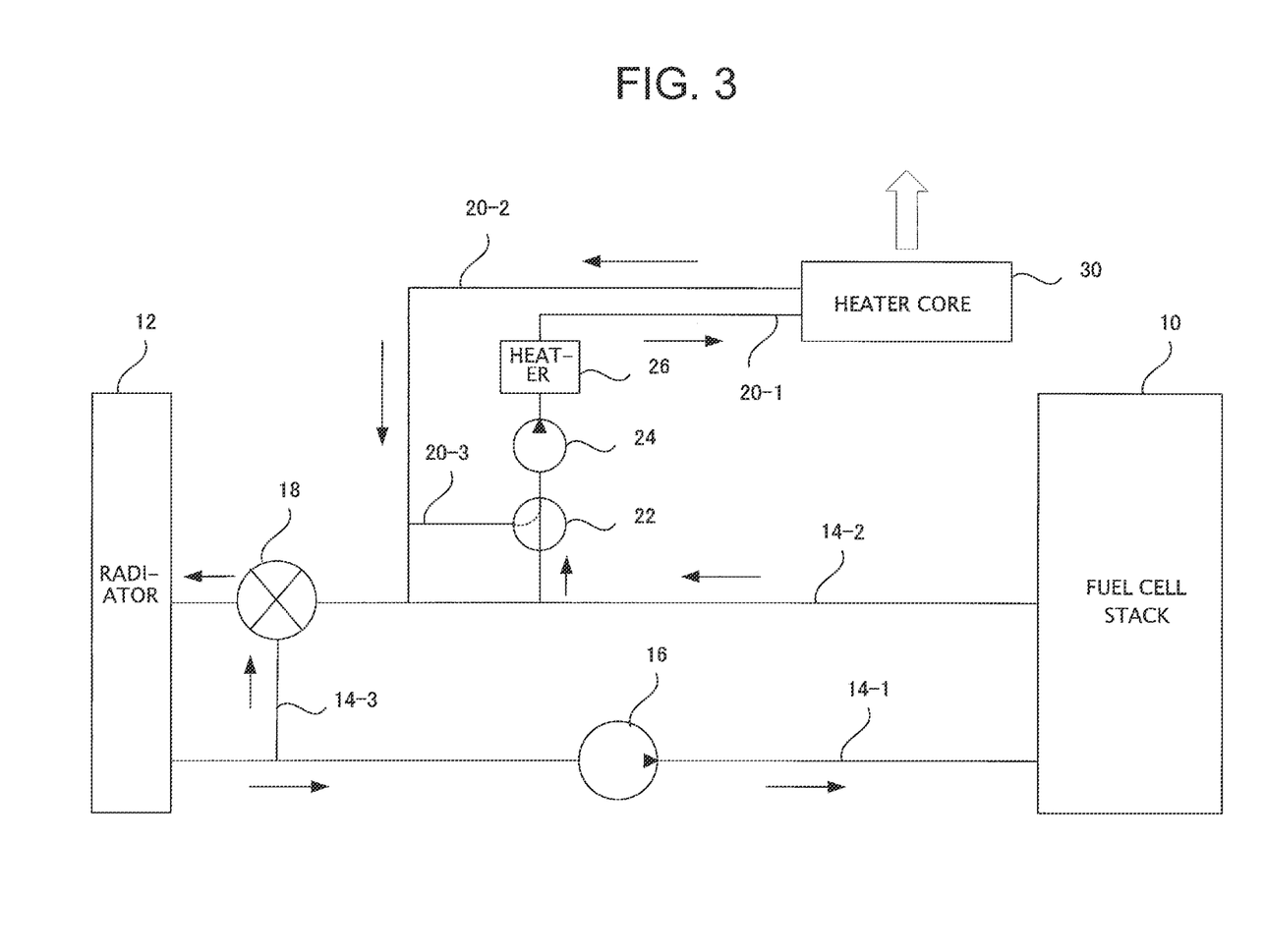
FIG. 3 is a diagram showing a state of a cooperation mode for the heating.

FIG. 3 shows a state of a cooperation mode for the heating. In the cooperation mode, the path from the branch pipeline 20-3 is closed by the three-way valve 22, and the heat medium from the pipeline 14-2 returns to the pipeline 14-2 after passing through the heater 26 and the heater core 30. Therefore, the heat exchange of the heater core 30 is controlled by both the heat generation of the FC stack 10 and the heat generation of the heater 26.

<Intermediate Mode>

An intermediate mode may be provided in which both the single circulation through the branch pipeline 20-3 and the circulation of the heat medium from the pipeline 14-2 are used in combination.

"Heating Control"

<Normal State>

In a normal state, an operation condition of the heater core 30 is determined in response to an indoor heating request, and the heat medium having a temperature and a flow rate corresponding to the operation condition is circulated to the heater core 30. For this purpose, the circulation path and the flow rate of the heat medium and the heat generation amount of the heater 26 are controlled in consideration of the temperature of the heat medium from the FC stack 10. The operation of the FC stack 10 is controlled according to a traveling state, and is not related to the heating request.

<Waste Heat Request of FC Stack>

When the heat generation amount in the vehicle is not sufficient for the required heating, for example, at a time of starting in a cold district or when an outside temperature is extremely low, a waste heat request of the FC stack 10 is generated by the control unit 40, the heat generation amount of the FC stack 10 is increased in accordance with the waste heat request, and the waste heat corresponding to the waste heat request is generated.

Here, in order to obtain the required amount of heat in the heater core 30, the waste heat request is obtained by calculating the required waste heat of the FC stack 10 by a predetermined method. For example, the required waste heat amount of the FC stack 10; that is, the waste heat request, is determined based on the heat medium temperature of the pipeline 14-2, the appropriate heat generation amount of the heater 26, and the like.

Figure 4:
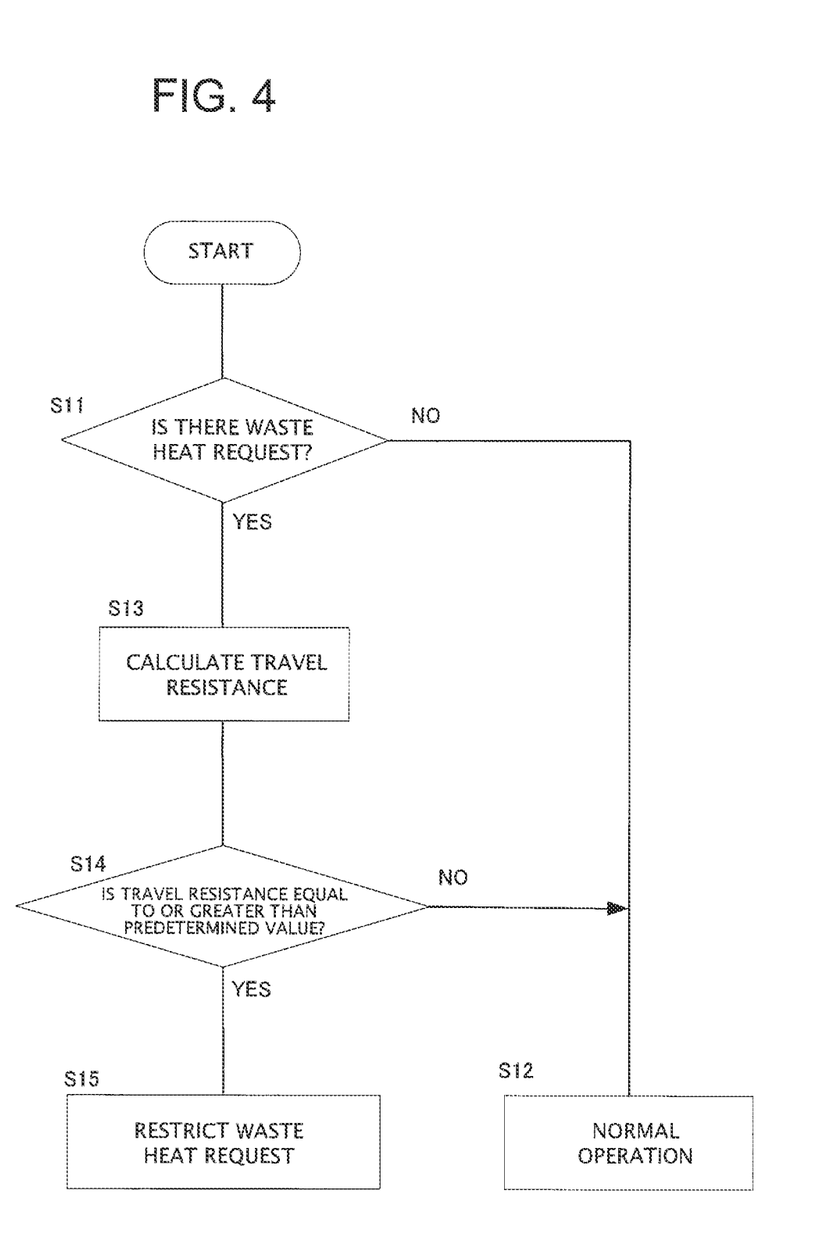
FIG. 4 is a flowchart showing processing for a waste heat request of the FC stack for the heating.

FIG. 4 is a flowchart showing processing in the control unit 40 for the waste heat request of the FC stack 10 for the heating.

First, it is determined whether there is the waste heat request of the FC stack 10 of the heating request (S11). When a result of the determination in S11 is NO (there is no waste heat request), no special processing is required, and thus a normal operation is continued (S12).

When the result of the determination in S11 is YES, a travel resistance is calculated (S13). First, a current travel resistance of the vehicle is calculated. In this case, a friction coefficient (for example, that at 25° C.) and gradient of a current road are acquired based on the map data, and a vehicle speed V of the vehicle is acquired. A vehicle front projection area, an air resistance coefficient, and the like of the vehicle may be stored, and stored values may be used. A travel resistance α at 25° C. is calculated by the following equation.

$$\alpha = (A)V^2 + C$$

Here, A is the air resistance coefficient at 25° C., V is the vehicle speed, and C is a tire rolling resistance at 25° C. The tire rolling resistance C is calculated based on a total weight of the vehicle and a rolling resistance coefficient at 25° C. The rolling resistance coefficient is influenced by a condition (paving material, dry and wet conditions, and the like) of a road surface, a tire (type, air pressure), a wheel weight, a state (temperature of grease) of a wheel bearing, and the like, but the rolling resistance coefficient in a standard state (25° C.) is used here.

As described above, the rolling resistance coefficient varies depending on a road state such as the condition of the road surface and the road gradient. Further, the air resistance coefficient A, the rolling resistance coefficient C, and the like also vary depending on current environmental states such as the outside temperature, a wind speed, snowfall, and rainfall. Therefore, in the present embodiment, various sensors are provided in the vehicle, or information is acquired from the server on the cloud so as to calculate a travel resistance β based on an air resistance coefficient A' and a rolling resistance C' in the current road state and the current environmental state. Various known methods can be used for the calculation of such a travel resistance.

$$\beta=(A')V^2+C'$$

Then, it is determined whether the travel resistance β in consideration of the calculated environmental state is equal to or greater than a predetermined value (S14). For example, a standard travel resistance when the vehicle travels on a flat standard road may be stored, and it may be determined whether the travel resistance is sufficiently greater than the standard travel resistance.

For this purpose, β−α is calculated based on the calculated travel resistances α and β, and it is determined whether β−α is greater than the predetermined threshold. For example, when the threshold is 20N, the determination of the following relationship is performed.

$$\beta-\alpha>20N$$

When a result of the determination in S14 is NO, the process proceeds to S12, and the normal operation is continued. On the other hand, when the result of the determination in S14 is YES, the travel resistance is greater than that in a normal case, and in this case, the waste heat request of the FC stack 10 is restricted (S15).

When the travel resistance is large, energy for the vehicle travel becomes large, and therefore, a load of the FC stack 10 also becomes large, and the heat generation amount also becomes large. Therefore, the temperature of the heat medium from the FC stack 10 rises. Therefore, in such a case, the waste heat request of the FC stack 10 for the heating is restricted, the inefficient operation of the FC stack 10 is reduced, and the vehicle traveling efficiency is improved. Accordingly, a travelable distance of the vehicle can be increased.

Here, in the above example, the travel resistance is calculated according to the current traveling state. In contrast, when a future traveling state is predicted, actual suitable control can be performed.

Figure 5:
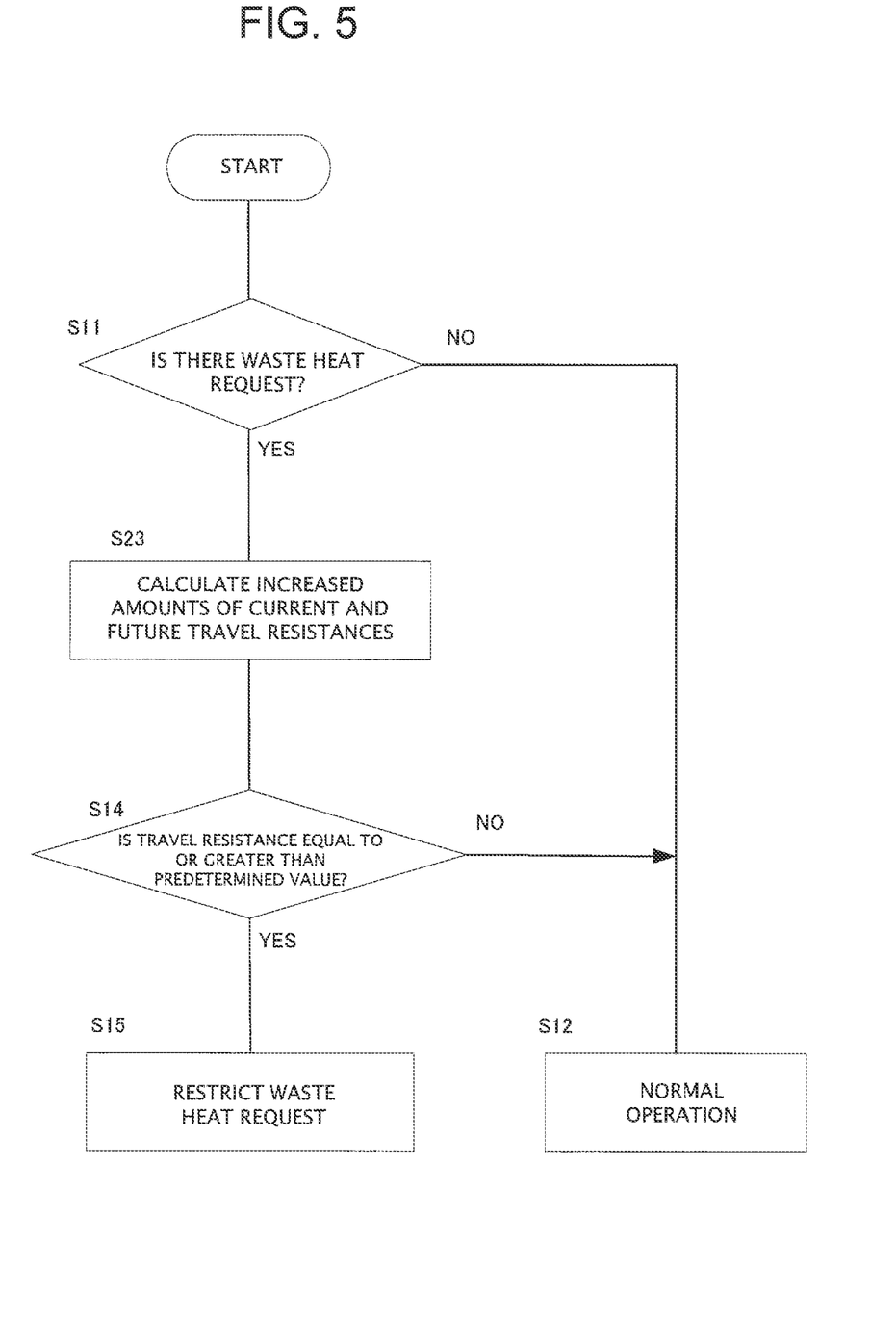
FIG. 5 is a flowchart of processing when predicting a travel resistance.

FIG. 5 is a flowchart of processing when predicting the travel resistance. In this way, in the calculation of the travel resistance in S13 of FIG. 4, not only the current travel resistance but also a future travel resistance is considered.

For example, when the destination is set in the navigation device 42 and the vehicle is traveling along the set route, the future travel resistance can be calculated on a premise that there is a high possibility that the vehicle travels along the route.

For example, average values of α and β may be calculated for traveling for a predetermined time or a predetermined distance (10 minutes or 10 km) from the present. The route to the destination may be targeted. The map data are stored for each discrete point, and data in which a target range is stored may be used as is for the gradient, the friction coefficient of the standard road surface, and the like. Further, an average value may be calculated by interpolating the discrete data. As environmental data (weather data) such as the temperature, a current temperature may be used. For example, only by replacing gradient data with the average value of the target range, the processing for the FC waste heat request of the present embodiment can be optimized.

Further, in the route traveling, optimization calculation may be performed to optimize the waste heat utilization of the FC stack such that the most efficient heating can be performed in consideration of weather forecast (for example, a change in temperature or a change in rainfall state at the time of traveling to the destination).

"Restriction of Waste Heat Request"

Figure 6:
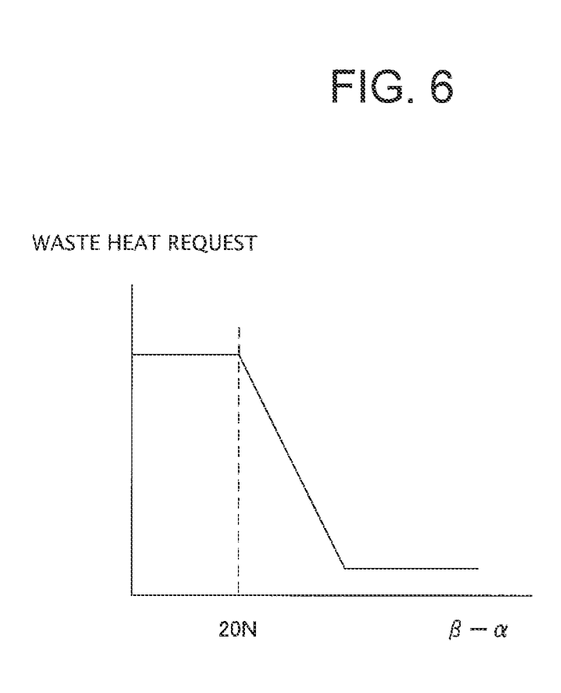
FIG. 6 is a diagram showing a restricted state of the waste heat request of the FC stack.

FIG. 6 is a diagram showing a restricted state of the waste heat request of the FC stack 10. As described above, the waste heat request is set to 100% and restriction is not performed until the difference β−α of the travel resistance as compared to the normal travel resistance reaches the predetermined threshold (for example, 20N). When β−α exceeds the threshold, the waste heat request is restricted. As β−α increases, the waste heat request is restricted to a low value, and the waste heat request becomes a sufficiently low value (may be set to 0 kW) subsequent to the predetermined threshold. By such processing, the operation of the heating using the waste heat of the FC stack 10 is restricted, and the restriction is applied to the heating. However, since the power generation amount of the FC stack 10 increases and the heat generation amount at the time of power generation increases due to the large travel resistance, there is a high possibility that the required heat amount can be ensured without increasing the waste heat amount for the heating. Further, a heating amount may be temporarily insufficient by the control in consideration of the prediction of the future traveling, but sufficient heating can be achieved in total.

Here, a restriction value of the waste heat request may be restricted as the heat generation amount (kW). In this case, a vertical axis represents the heat generation amount (kW), but a characteristic is the same as that in FIG. 6.

In this way, in the present embodiment, the waste heat request of the FC stack 10 is restricted in consideration of the current travel resistance or the current and future travel resistances. Accordingly, operation efficiency of the FC stack 10 can be improved, and a maximum travel distance can be maintained large.

"Others"

When the travel resistance is large and the waste heat of the FC stack 10 is large or when it is predicted that the waste heat is large, the heating by the heater 26 may be restricted because the heating can be performed using the waste heat. This also makes it possible to improve the heating efficiency and to extend the vehicle travel distance.

The invention claimed is:

1. An air conditioner for a fuel cell electric vehicle that uses waste heat of a fuel cell stack for heating, the air conditioner comprising:
    a heater core configured to circulate a heat medium from the fuel cell stack and perform the heating by heat exchange with air; and
    a control unit configured to calculate a travel resistance when the fuel cell electric vehicle travels on a road based on a road state affecting the travel resistance generated when the fuel cell electric vehicle travels and an environmental state, and control the heat exchange in the heater core based on the calculated travel resistance, wherein
    when the calculated travel resistance is equal to or greater than a predetermined value, the control unit restricts an operation for the heating using the waste heat of the fuel cell stack.

2. The air conditioner for a fuel cell electric vehicle according to claim 1, wherein the road state includes a road gradient of the road on which the vehicle travels and a friction coefficient of a standard road surface of the road.

3. The air conditioner for a fuel cell electric vehicle according to claim 1, wherein
the environmental state includes a temperature and a rainfall state during the traveling.

4. The air conditioner for a fuel cell electric vehicle according to claim 1, wherein
when a difference between a standard travel resistance when the road state and the environmental state are standard and the calculated travel resistance is equal to or greater than a predetermined value, the control unit restricts the operation for the heating using the waste heat of the fuel cell stack.

5. The air conditioner for a fuel cell electric vehicle according to claim 1, further comprising:
a navigation device configured to perform route guidance on a set route, wherein
the control unit calculates a travel resistance along the set route, and restricts the operation for the heating using the waste heat of the fuel cell stack based on the travel resistance along the set route.

* * * * *